United States Patent [19]

Leurer

[11] Patent Number: 4,841,784
[45] Date of Patent: Jun. 27, 1989

[54] METHOD AND APPARATUS FOR MONITORING THE TENSILE FORCE ON A THREAD

[75] Inventor: Erwin Leurer, Fuchsstadt, Fed. Rep. of Germany

[73] Assignee: FAG Kugelfischer Georg Schafer (KGaA), Fed. Rep. of Germany

[21] Appl. No.: 168,500

[22] Filed: Mar. 15, 1988

Related U.S. Application Data

[63] Continuation-in-part of Ser. No. 833,201, Feb. 25, 1986, Pat. No. 4,759,226.

[30] Foreign Application Priority Data

Mar. 17, 1987 [DE] Fed. Rep. of Germany ....... 3708565

[51] Int. Cl.$^4$ ................................................ G01L 5/10
[52] U.S. Cl. ................................ 73/862.48; 340/668; 340/677
[58] Field of Search ................ 73/828, 862.48, 862.42, 73/862.43, 862.44; 340/668, 677, 782; 242/148; 66/163

[56] References Cited

U.S. PATENT DOCUMENTS

| | | | |
|---|---|---|---|
| 3,495,454 | 2/1970 | Heimes | 73/862.48 |
| 4,000,782 | 1/1977 | Finkelston | 73/862.24 X |
| 4,597,297 | 7/1986 | Smith | 73/862.48 |
| 4,720,702 | 1/1988 | Martens | 340/677 |
| 4,759,226 | 7/1988 | Leurer | 73/862.48 |

Primary Examiner—Charles A. Ruehl
Attorney, Agent, or Firm—Ostrolenk, Faber, Gerb & Soffen

[57] ABSTRACT

A device for monitoring the tension on a thread comprises a frame for retaining the thread; a leaf spring on the frame for bearing against the thread and being displaced thereby as a function of such tension; a generator, such as a permanent magnet on the leaf spring, for generating an electromagnetic field between the frame and the leaf spring which varies as a function of such displacement; a Hall effect sensor which senses such field and generates an output signal indicative of such tension; and an electronic system for receiving said output signal and indicating whether said output signal and thereby said thread tension is within a predetermined desirable range. The indication is made at least at a location in the vicinity of the frame where it can be seen by persons who are responsible for maintaining the correct thread tension, and may comprise a plurality of LEDs for indicating respectively when the thread tension is too high, too low, and at the correct level. A method and device are also disclosed wherein the AC component of the sensor output is detected, and compared against an upper limit voltage and a lower limit voltage to determine whether the AC component above the upper limit voltage or below the lower limit voltage, and a respective LED is lit to indicate whether the AC component and the thread tension is too low, too high, or within the desirable range.

12 Claims, 4 Drawing Sheets

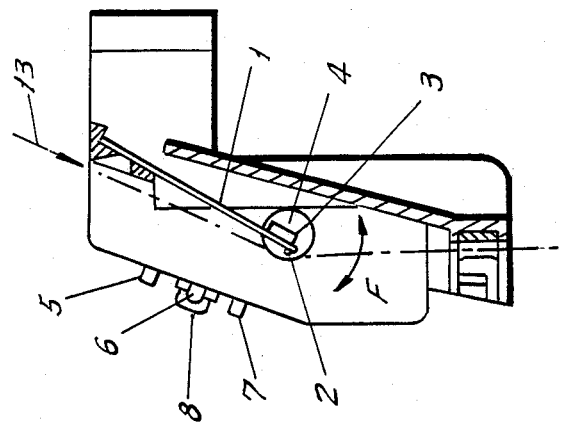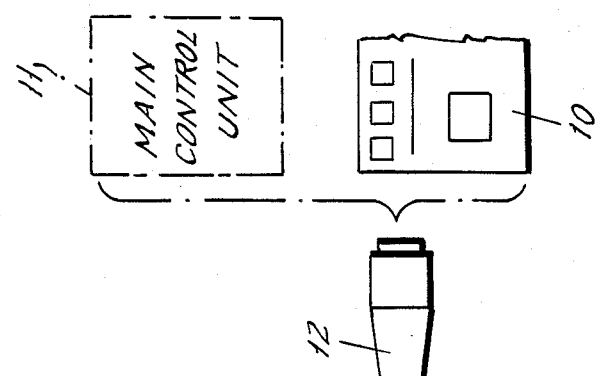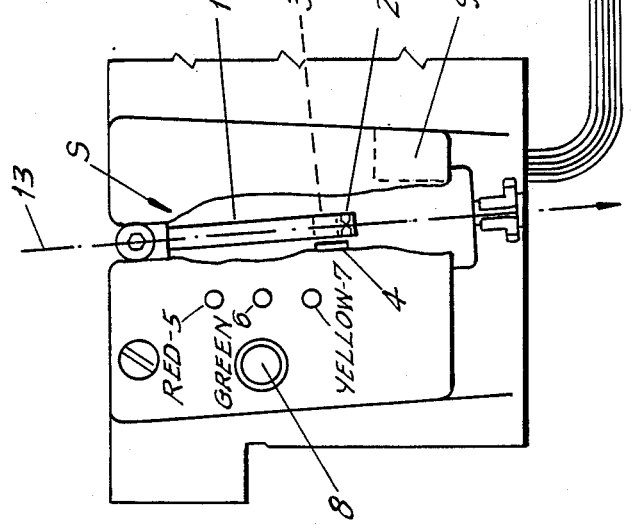

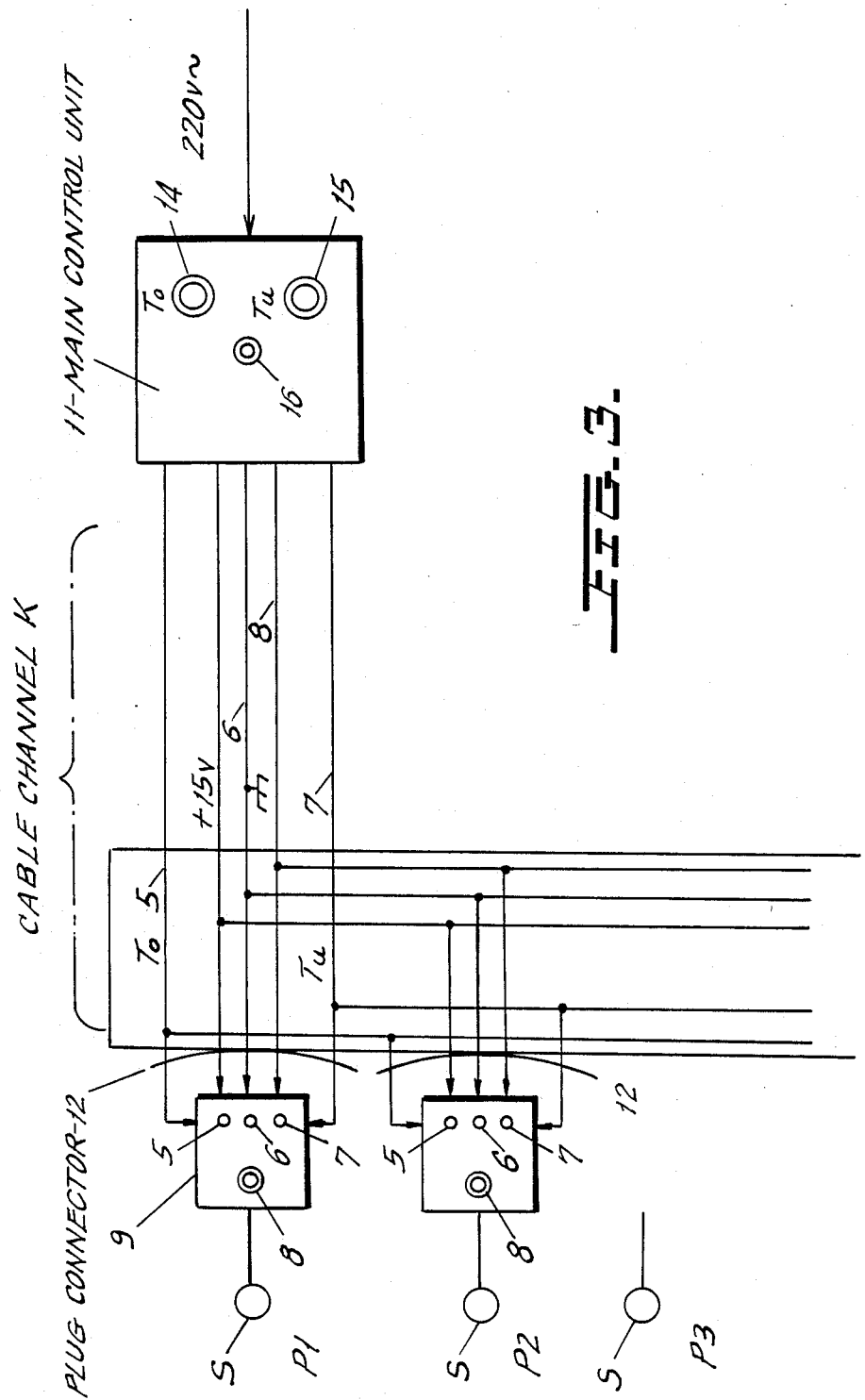

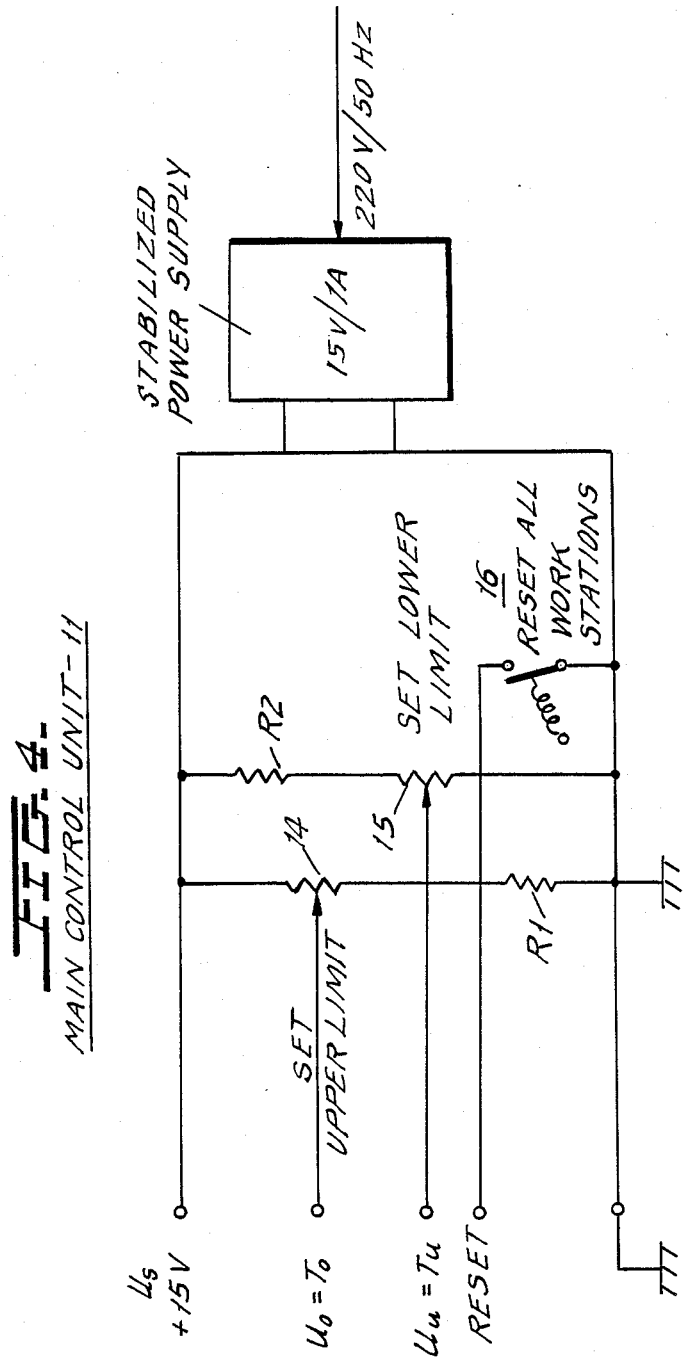

ELECTRONIC UNIT

METHOD AND APPARATUS FOR MONITORING THE TENSILE FORCE ON A THREAD

CROSS-REFERENCE TO RELATED APPLICATION

This is a continuation-in-part of U.S. Pat. No. application Ser. No. 833,201, filed Feb. 25, 1986, allowed, Pat. No. 4,759,226.

BACKGROUND OF THE INVENTION

The present invention relates to a method and an apparatus for monitoring the tensile force on a thread. It relates more particularly to an electronic system for analyzing an electrical signal which is indicative of said tensile force.

The invention may advantageously be employed with a known thread tension measuring device. One such device is disclosed in Federal Republic of Germany DE-OS No. 3,506,698, which corresponds to commonly-assigned U.S. application Ser. No. 833,201, filed Feb. 25, 1986, allowed, the disclosures of which are incorporated herein by reference. This device measures thread tensile force by generating an output signal indicative of the tensile force, which is contemplated to be transmitted to a central computer system.

In U.S. Ser. No. 833,201, one end of a spring element is clamped fast to a frame. The spring element is provided at its free outer end with a low-friction diabolo, which may be dumbbell-shaped, and over which a thread is guided. Also on the free end is a permanent magnet. Mounted at a fixed position on the frame at a given distance from the magnet is a Hall effect sensor. The diabolo bears against the thread, which is guided through the frame, so that the spring element is flexed to a greater or lesser degree in response to the tension on the thread. The Hall effect sensor detects the resulting movements of the magnet, whereby an electrical signal is generated which is indicative of the thread tension.

A computer system is contemplated to evaluate the data from one or more work stations, and sound an alarm or stop the thread, for example, if the thread tension is too low or too high. The computer system may also have a display.

Disadvantageously, however, operating personnel at the work stations do not receive any information in this prior art system.

SUMMARY OF THE INVENTION

The principal object of the present invention is to eliminate the above-described disadvantage.

In the invention, the sensor of the installed electronic system supplies a signal which consists of a DC-voltage part and an AC-voltage part. The AC-voltage part is separated from the DC-voltage part by an electronic unit and then is compared, preferably by a window discriminator against preset upper and lower limits. The latter determines whether the AC-voltage signal lies outside of the preset tolerance limits, as a function of a central tolerance setting, which represents the proper steady-state thread tension level which is set on the machinery. In this connection, a distinction is made between the upper limit (To) and the lower limit (Tu). If, for instance, a disturbing peak exceeds the tolerance limit To, then a red lightemitting diode lights up. If a peak drops below the tolerance limit Tu a yellow light-emitting diode lights up.

If a limit is exceeded, an operator adjusts the machinery to correct the error condition. Then the light-emitting diodes are extinguished by pressing a reset push button. When the signal is between the upper and lower limits, a green light-emitting diode is lit, to inform operating personnel that the equipment is operating properly.

The central electronic system for establishing the tolerance comprises a main control unit which supplies power to all the individual sensing devices, has two potentiometers for setting the upper and lower tolerance limits, and has a reset button for extinguishing all or some of the lights at all work stations. The potentiometers in the main control unit set a high reference voltage representing the upper tolerance and a low reference voltage representing the lower tolerance. This system allows the user to recognize disturbing peaks at each work station rapidly and interactively.

The embodiment also comprises a data collection system, which may comprise a computer and preferably is portable for mobile monitoring and analysis of data from many work stations. The data collection system advantageously has a digital voltage display, and may be connected by a plug connector to the output signal of the sensor. The absolute measurement output signal of the sensor is directly available for calibration and analysis by the data collection system.

According to a basic aspect of the invention, a device for monitoring the tension on a thread comprises a frame; resilient means on the frame for bearing against the thread and being displaced thereby as a function of such tension; generating means for generating an electromagnetic field between the frame and the resilient means which varies as a function of such displacement; sensor means for employing the Hall effect to sense such field and to generate an output signal indicative of such tension; and electronic means for receiving said output signal and indicating at least at a location in the vicinity of said frame whether said output signal and thereby said thread tension is within a predetermined desirable range.

Preferably, the resilient means includes a leaf spring mounted on the frame and deflectable along its length, having a dumbbell-shaped guide member comprising sapphire at an end thereof for engaging the thread.

According to an important aspect of the invention, said electronic means comprises detecting means for receiving said sensor means output signal and detecting an AC component therein; reference means for generating an upper limit voltage and a lower limit voltage; comparing means for comparing said AC component against said upper and lower limit voltages and outputting comparison data; and indicating means for receiving said comparison data and indicating at least at said location in the vicinity of said frame whether said AC component is above, between, or below said limit voltages.

The comparing means may comprise an integrated window discriminator circuit. The indicating means may comprise three visual displays such as LEDs for indicating respectively when said AC component is above, between, or below said limit voltages. A pair of latches may respectively store said comparison information when said AC component is above said upper limit voltage or below said lower limit voltage to prolong the indication thereof; and a reset circuit may be included for resetting said latches.

According to further aspects of the invention, a device for monitoring the tension on a thread may comprise a frame; resilient means including a leaf spring mounted on the frame and deflectable along its length for engaging the thread and being displaced thereby as a function of such tension; generating means on the resilient means for generating an electromagnetic field between the frame and the resilient means which varies as a function of such displacement; and sensor means on the frame for sensing such field and generating an output signal indicative of such tension; the leaf spring having a dumbbellshaped guide member comprising sapphire at an end thereof, the dumbbell-shaped guide member having enlarged portions at ends thereof, and a central portion extending between said enlarged portions and having substantially uniform thickness, for engaging the thread with a low coefficient of friction at any point along said central portion.

Also, a device for monitoring the tension on a thread may comprise a frame; resilient means having two ends, the resilient means being mounted at one end thereof on the frame and being deflectable along the length of the resilient means; the resilient means having a dumbbell-shaped guide member comprising sapphire at the other end thereof for bearing against the threat at a bearing point with a low coefficient of friction and being displaced thereby as a function of such tension; the dumbbell-shaped guide member having enlarged portions at ends thereof, which form therebetween a central notch-like portion for engaging the thread; the central notch-like portion of the guide member including a central portion extending between said enlarged portions and having substantially uniform thickness, for permitting said thread to be engaged by said guide member at any point along said central portion; generating means for generating an electromagnetic field between the frame and the resilient means which varies as a function of such displacement; and sensor means for sensing such field and generating an output signal indicative of such tension.

According to a further embodiment of the invention, a method of monitoring the tensile force on a thread comprises the following steps:

generating an electrical signal which is indicative of an absolute level of said tensile force;

detecting an AC component of said electrical signal which is indicative of variations in said tensile force:

comparing said AC component against an upper limit voltage and a lower limit voltage to generate comparison data; and displaying said comparison data to indicate whether said AC component is above said upper limit or below said lower limit, and preferably also whether said AC component is between said upper and lower limits. As with the apparatus invention, the method may include lighting indicator lights such as LEDs to display said comparison data; or feeding the comparison data to a data collection system to record the same.

Other objects and features of the invention are explained below with reference to an illustrative embodiment.

BRIEF DESCRIPTION OF THE DRAWINGS

FIG. 1 is a front view of a thread tension sensing device and associated circuitry according to an embodiment of the invention;

FIG. 2 is a cross-sectional side view corresponding to FIG. 1;

FIG. 3 is a block diagram showing a plurality of sensors and electronic units, and a main control unit for controlling and supplying power thereto;

FIG. 4 is a schematic diagram of the main control unit of FIGS. 1 and 3; and

DESCRIPTION OF AN EMBODIMENT OF THE INVENTION

Figure 5:
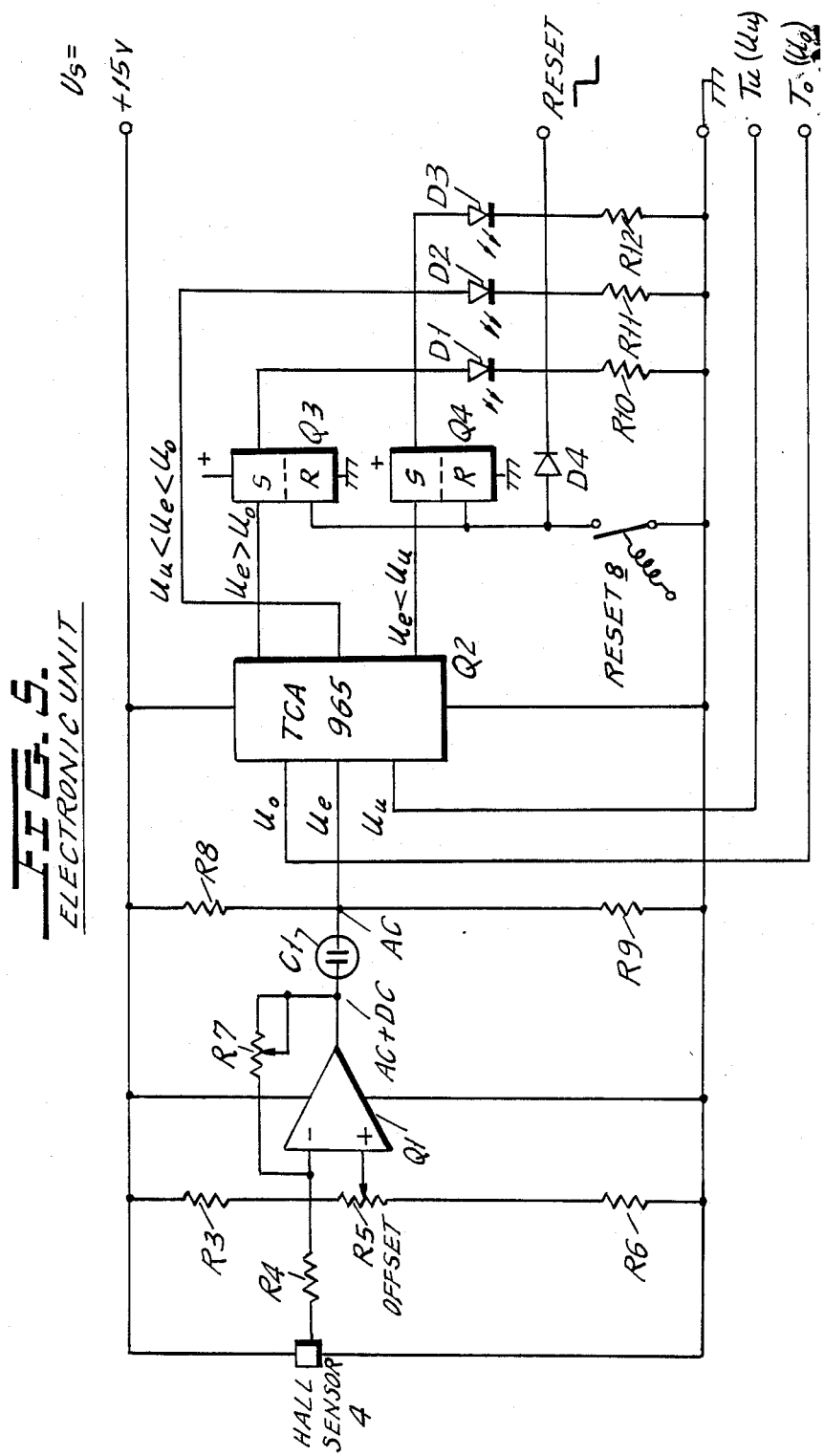
FIG. 5 is a schematic diagram of the circuitry of the electronic units of FIGS. 1 and 3.

FIG. 1 is a front view of a sensing device S embodying the invention. The operation of the device S is generally analogous to that disclosed in application U.S. Ser. No. 833,201. The device S comprises a thread guide or diabolo 2, which advantageously is made of sapphire, and a permanent magnet 3, which are carried on the free end of an elongated leaf spring 1. At a given distance from the magnet, a Hall effect sensor 4 is supported on a stationary frame. The thread 13 is conducted by guide means on the frame (not shown), over the diabolo 2, from the thread source to the spindle or texturing unit or other work station (not shown). The tension on the thread 13 flexes the leaf spring 1 in a plane substantially parallel to the plane of the Hall effect sensor 4. The amount of flexing, and thus the position of the magnet 3, is proportional to the thread tension. Thus, an electrical output signal from the Hall effect sensor 4 is indicative of the thread tension.

Also shown in FIG. 1 is an electronic unit 9, which receives the output signal from the sensor 4. As will be further explained below, light-emitting diodes (LEDs) 5, 6 and 7 visually indicate deviations from a preset thread tension tolerance. At least the LEDs 5 and 7 can be extinguished by a reset button 8. A plug connector 12 connects the electronic unit 9 to a main control unit 11, described below, and to a data collection system 10, which preferably comprises a computer, for displaying and analyzing the thread tension data.

FIG. 2 is a cross-sectional side view of the embodiment, showing particularly the path of the thread 13 over the diabolo 2. An arrow F indicates the direction of flexing of the leaf spring in response to the tension on the thread 13.

FIG. 3 is block diagram showing a plurality of devices S which are located at respective work stations P1, P2, P3, etc. Integrated with each sensor S (as seen more clearly in FIGS. 1 and 2) is a respective electronic unit 9 which, as shown, has the reset button 8 and LEDs 5, 6 and 7 mounted thereon. The plug connector 12 for connecting each electronic unit 9 to additional circuitry is shown schematically. Also shown schematically is a cable channel K, which, as shown, includes a plurality of cables running respectively from the electronic units 9 in parallel. The cable channel K may be an elongated housing extending past the plurality of work stations and comprising a corresponding plurality of socket connectors for mating with the plug connector 12. Each cable includes respective conductors running to the LEDs 5, 6 and 7 and the reset button 8. The cable channel runs to the main control unit 11, which also supplies +15V to the electronic unit. The cable channel K also runs to the data collection system 10, as shown in FIG. 1.

The main control panel 11 comprises two potentiometers 14 and 15, for setting the upper deviation limit To and the lower deviation limit Tu, respectively. The light-emitting diodes 5 and 7 of the respective work stations may be extinguished by pressing a reset button 16 on the main control panel 11.

FIG. 4 is a schematic diagram showing the main control unit 11. +15V/1A is supplied by a stabilized power supply. The potentiometer 14 and a resistor R1 form a voltage divider for supplying an upper limit voltage To. The potentiometer 15 and a resistor R2 form a voltage divider for supplying a lower limit voltage Tu. The unit 11 also houses switch 16, which is preferably a normally-open pushbutton switch, connected between ground and an output reset terminal.

FIG. 5 is a schematic diagram showing the Hall effect sensor 4 and the electronic unit 9. The electrical signal from the sensor 4 is amplified by a network comprising an operational amplifier Q1 and resistors R3–R7. Then the DC and AC components of the signal are decoupled by a decoupling capacitor C1 as will be readily understood by one of ordinary skill in the art. The resulting AC signal is designated $u_e$.

The signal $u_e$ is compared against the upper limit voltage $u_o$ (=To) and the lower limit voltage $u_u$ (=Tu) by a comparator Q2. As shown, the comparator Q2 may advantageously be the well-known TCA965 window discriminator manufactured by Siemens AG, Munich, Federal Republic of Germany. However, any suitable integrated or discrete comparator circuit may be used as well.

When $u_e$ goes higher than $u_o$, a level from Q2 sets a latch Q3, whereby a high level is supplied to light the red LED D1. When $u_e$ goes lower than $u_u$, a level from Q2 sets a latch Q4, whereby a high level is supplied to light the yellow LED D3. Finally, when $u_e$ is between $u_u$ and $u_o$, the comparator Q2 supplies a high level to light the green LED D2. Both latches Q3 and Q4 may be reset by depressing the normally-open pushbutton switch 8. They may also be reset by a reset level received via a diode D4 from the main control unit 11.

The embodiment also comprises a data collection system, which may comprise a computer and preferably is portable for mobile monitoring and analysis of data from many work stations.

The system is calibrated as follows. A standard thread having a predetermined tension thereon is supplied to the sensing device S (FIGS. 1–2). The absolute sensor signal is available to the data collection system by means of the plug connector 12. The amplification of the sensor signal is adjusted by means of potentiometer R7 and the center point of the voltage range is adjusted according to the proper steady-state operating point of the machinery by means of potentiometer R5 (see FIG. 5). By means of the digital display on the data collection system 10, the sensor signal is measured over a range of thread tension levels to determine the acceptable tolerance wherein the green LED D2 may be lighted. Then the upper and lower tolerances are set by adjusting the potentiometers 14 and 15 to establish appropriate upper and lower limit voltages.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. A device for monitoring the tension on a thread, comprising;
   a frame;
   resilient means on the frame for bearing against the thread and being displaced thereby as a function of such tension;
   generating means for generating an electromagnetic field between the frame and the resilient means which varies as a function of such displacement;
   sensor means for employing the Hall effect to sense such field and to generate an output signal indicative of such tension;
   electronic means for receiving said output signal and indicating at least at a location in the vicinity of said frame whether said output signal and thereby said thread tension is within a predetermined desirable range;
   in which the resilient means includes a leaf spring mounted on the frame and deflectable along its length; and
   in which the leaf spring has a dumbbell-shaped guide member at an end thereof for engaging the thread.

2. A device as in claim 1, in which the guide member comprises sapphire.

3. A device for monitoring the tension on a thread, comprising:
   a frame;
   resilient means on the frame for bearing against the thread and being displaced thereby as a function of such tension;
   generating means for generating an electromagnetic field between the frame and the resilient means which varies as a function of such displacement;
   sensor means for employing the Hall effect to sense such field and to generate an output signal indicative of such tension;
   electronic means for receiving said output signal and indicating at least at a location in the vicinity of said frame whether said output signal and thereby said thread tension is within a predetermined desirable range;
   in which the generating means includes a magnet mounted on the resilient means for displacement therewith; and
   in which the resilient means includes a leaf spring mounted on the frame and deflectable along its length, and the magnet is mounted on a portion of the leaf spring away from the frame.

4. A device as in claim 3, in which the sensor means is mounted on the frame.

5. A device as in claim 4, in which the displacement of the magnet is substantially in a plane spaced a constant distance from the sensor means.

6. A device for monitoring the tension on a thread comprising:
   a frame;
   resilient means on the frame for bearing against the thread and being displaced thereby as a function of such tension;
   generating means for generating an electromagnetic field between the frame and the resilient means which varies as a function of such displacement;
   sensor means for employing the Hall effect to sense such field and to generate an output signal indicative of such tension; and electronic means for receiving said output signal and indicating at least at a location in the vicinity of said frame whether said output signal and thereby said thread tension is within a predetermined desirable range;
wherein said electronic means comprises
detecting means for receiving said sensor means output signal and detecting an AC component therein;
reference means for generating an upper limit voltage and a lower limit voltage;
comparing means for comparing said AC component against said upper and lower limit voltages and outputting comparison data; and
indicating means for receiving said comparison data and indicating at least at said location in the vicinity of said frame whether said AC component is above, between, or below said limit voltages; and
wherein said comparing means comprises and integrated window discriminator circuit.

7. A device for monitoring the tension on a thread comprising:
a frame;
resilient means on the frame for bearing against the thread and being displaced thereby as a function of such tension;
generating means for generating an electromagnetic field between the frame and the resilient means which varies as a function of such displacement;
sensor means for employing the Hall effect to sense such field and to generate an output signal indicative of such tension; and
electronic means for receiving said output signal and indicating at least at a location in the vicinity of said frame whether said output signal and thereby said thread tension is within a predetermined desirable range;
wherein said electronic means comprises
detecting means for receiving said sensor means output signal and detecting an AC component therein;
reference means for generating an upper limit voltage and a lower limit voltage;
comparing means for comparing said AC component against said upper and lower limit voltages and outputting comparison data; and
indicating means for receiving said comparison data and indicating at least at said location in the vicinity of said frame whether said AC component is above, between, or below said limit voltages; and
wherein said indicating means comprises three visual displays for indicating respectively when said AC component is above, between, and below said limit voltages.

8. A device as in claim 7, wherein said visual displays are LEDs.

9. A device as in claim 7, wherein said indicating means further comprises at least a pair of latches for respectively storing said comparison information when said AC component is above said upper limit voltage or below said lower limit voltage to prolong the indication thereof.

10. A device as in claim 9, further comprising a reset circuit for resetting said latches.

11. A device for monitoring the tension on a thread, comprising:
a frame;
resilient means including a leaf spring mounted on the frame and deflectable along its length for engaging the thread and being displaced thereby as a function of such tension;
generating means on the resilient means for generating an electromagnetic field between the frame and the resilient means which varies as a function of such displacement; and
sensor means on the frame for sensing such field and generating an output signal indicative of such tension;
the leaf spring having a dumbbell-shaped guide member comprising sapphire at an end thereof, the dumbbell-shaped guide member having enlarged portions at ends thereof, and a central portion which extends between said enlarged portions and has substantially uniform thickness, for engaging the thread with a low coefficient of friction at any point along said central portion.

12. A device for monitoring the tension on a thread, comprising:
a frame;
resilient means having two ends, the resilient means being mounted at one end thereof on the frame and being deflectable along the length of the resilient means; the resilient means having a dumbbell-shaped guide member comprising sapphire at the other end thereof for bearing against the thread with a low coefficient of friction and being displaced thereby as a function of such tension; the dumbbell-shaped guide member having enlarged portions at ends thereof, and a central portion for engaging the thread; said central portion extending between said enlarged portions and having substantially uniform thickness, for permitting said thread to be engaged by said guide member at any point along said central portion;
generating means for generating an electromagnetic field between the frame and the resilient means which varies as a function of such displacement; and
sensor means for sensing such field and generating an output signal indicative of such tension.

* * * * *